United States Patent
Masputra et al.

(10) Patent No.: US 7,308,000 B2
(45) Date of Patent: Dec. 11, 2007

(54) METHODS AND SYSTEMS FOR EFFICIENT MULTI-PACKET DATA PROCESSING IN A LAYERED NETWORK PROTOCOL

(75) Inventors: Cahya A. Masputra, Millbrae, CA (US); Kacheong Poon, Milpitas, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 985 days.

(21) Appl. No.: 10/289,642

(22) Filed: Nov. 7, 2002

(65) Prior Publication Data

US 2004/0090988 A1    May 13, 2004

(51) Int. Cl.
*H04J 3/16*    (2006.01)
(52) U.S. Cl. .................................... 370/469; 709/250

(58) Field of Classification Search .................. None
See application file for complete search history.

(56) References Cited

U.S. PATENT DOCUMENTS 6,757,746 B2 *    6/2004    Boucher et al. ............ 709/250

* cited by examiner

*Primary Examiner*—Edan Orgad
*Assistant Examiner*—Robert W. Wilson
(74) *Attorney, Agent, or Firm*—Sonnenschein Nath & Rosenthal LLP

(57) ABSTRACT

Methods and systems consistent with the present invention provide a mechanism for accepting extended amounts of data in a layered network protocol. The methods and systems thus allow the network protocol to more efficiently receive data and forward the data to the correct entity. As a result, the programs experience greater network data throughput. The methods and systems may be implemented in widely accepted Internet Protocol (IP) and Transmission Control Protocol (TCP) networks.

39 Claims, 3 Drawing Sheets

METHODS AND SYSTEMS FOR EFFICIENT MULTI-PACKET DATA PROCESSING IN A LAYERED NETWORK PROTOCOL

CROSS REFERENCE TO RELATED APPLICATIONS

This application in related to Ser. No. 10/170,839, titled "A System and Method for An Efficient Transport Layer Transmit Interface", filed Jun. 12, 2002, Ser. No. 10/170,919, titled "A System and Method for a Multi-Data Network Layer Transmit Interface", filed Jun. 12, 2002, and Ser. No. 10/254,699, titled "Multi-Data Receive Processing According to a Data Communication Protocol", filed Sep. 24, 2002. Each of the three applications identified above is incorporated herein by reference in its entirety.

FIELD OF THE INVENTION

This invention relates to computer networking protocols. In particular, this invention relates to data communication between layers of a networking protocol.

BACKGROUND OF THE INVENTION

Modern computer networks implement sophisticated protocols to ensure reliable transport of data between data processing systems. One of the most well accepted and widely implemented protocol sets is the Transmission Control Protocol/Internet Protocol (TCP/IP). TCP/IP is built on IP. Whereas IP defines an unreliable connectionless packet delivery service, TCP introduces network services that implement reliable stream delivery.

TCP/IP software is layered. In other words, TCP/IP software is organized into conceptual layers on top of physical hardware. In most models, the TCP/IP software includes four layers. The names for the layers vary, but one set of names often used specifies that the "Application" (first) layer resides on top of the "Transport" (second) layer that resides on top of the "Network" (third) layer that resides on top of the "Data Link" (fourth) layer. The Data Link layer resides, finally, on top of the physical hardware. The physical hardware is sometimes considered a fifth layer.

The Data Link layer includes the TCP/IP software that receives and transmits IP datagrams over the physical hardware. To that end, the Data Link layer may include device drivers that provide interfaces to the physical hardware. The device drivers are responsible for accepting data from the Network layer and transmitting the data over the physical hardware, as well as receiving data from the physical hardware and forwarding the data to the Network layer for processing.

The Network layer accepts Transport layer requests to send data packets to a specific machine. In this regard, the Network layer is responsible for encapsulating the packets into IP datagrams and forwarding the datagrams to the Data Link layer for delivery. The Network layer also accepts data that the Data Link layer received over the physical hardware. In response, the Network layer checks the validity of the data and uses a routing algorithm to determine if the data should be forwarded to a different machine, or delivered to the local machine. IP processing occurs at the Network layer.

The Transport layer provides network communication between programs. In addition to regulating data flow to a program, the transport layer may also ensure that the data arrives without error and in sequence. For that reason, the transport layer expects the receiver to send back acknowledgements and to have the sender retransmit lost packets. The transport layer also divides the data to be transmitted into packets for transmission. TCP processing occurs at the Transport layer.

Efficient communication between the Network layer and the Data Link layer and between the Network layer and the Transport layer is critical for maximizing network throughput. However, in the past, TCP/IP protocol suite implementations have placed unduly restrictive limitations on the exchange of data between the Data Link layer and the Network layer and between the Network layer and the Transport layer. In general, substantial overhead is required to pass data between layers. As a result, network throughput is reduced.

Therefore, a need has long existed for more efficiently communicating data between network protocol layers in order to overcome the problems noted above and others previously experienced.

SUMMARY OF THE INVENTION

Methods and systems consistent with the present invention provide a mechanism for transferring extended amounts of data in a layered network protocol. The methods and systems thus allow the network protocol to more efficiently receive data and forward the extended amount of data to the correct entity. As a result, programs experience greater network data throughput.

According to one aspect of the present invention, such methods and systems, as embodied and broadly described herein, query for multi-data processing capability in the Data Link layer. If the Data Link layer is multi-data capable, then the Network layer will accept multiple packets per call from the Data Link layer. As a result, the Network layer, as will be described in more detail below, receives multiple data packets batched together that may be examined, manipulated, or forwarded to the Transport layer very efficiently. In general, fewer transfers are required to provide a given amount of data to the Network or Transport layer and, ultimately, to the destination for the data (e.g., an application program).

Methods and systems consistent with the present invention overcome the shortcomings of the related art, for example, by allowing the Network layer and the Transport layer to accept multiple data packets in one call from the Data Link layer. Fewer calls are used to obtain data, and the data is arranged in memory for more efficient access. Less overhead accompanies data transfer and the data can be examined and manipulated faster. The data destination (such as an application program) thus experiences greater network data throughput.

According to methods consistent with the present invention, a method is provided in a data processing system having network protocol layers, including at least a first layer (e.g., a Data Link layer) and a second layer (e.g., a Network layer). The method comprises determining whether the first layer is multi-data capable such that it provides multiple packets per call, for example, by aggregating received packets. When the first layer is a multi-data capable layer, the method receives, at the second layer, a first message sent by the first layer that includes a header buffer identifier and a payload buffer identifier. The header buffer identifier specifies a header buffer that stores multiple aggregated packet headers and the payload buffer identifier specifies a payload buffer that stores multiple aggregated payloads. The method also processes at least one of the aggregated packet headers to determine a destination for the aggregated payloads.

In accordance with systems consistent with the present invention, a data processing system is provided. The data processing system includes a memory and a processor. The memory holds a network protocol that includes a first layer and a second layer different than the first layer, and a data source (e.g., another network layer). The processor runs the network protocol, in which the first layer receives a first message sent by the data source. The message includes a header buffer identifier and a payload buffer identifier. As noted above, the header buffer identifier specifies a header buffer that holds multiple aggregated packet headers and the payload buffer identifier specifies a payload buffer that holds multiple aggregated payloads. The first layer processes at least one of the aggregated packet headers to determine a second layer destination (e.g., a particular instance of the second layer).

In addition, a computer-readable medium is provided. The computer-readable medium contains instructions cause a data processing system, having network protocol layers comprising at least a first layer and a second layer different than the first layer, to perform a method. The method comprises receiving, at the second layer, a first message sent by the first layer comprising a header buffer identifier pointing to aggregated packet headers and a payload buffer identifier pointing to aggregated payloads, and processing, by the second layer, at least one of the aggregated packed headers to determine a destination for the aggregated payloads.

Other apparatus, methods, features and advantages of the present invention will be or will become apparent to one with skill in the art upon examination of the following figures and detailed description. It is intended that all such additional systems, methods, features and advantages be included within this description, be within the scope of the present invention, and be depicted by the accompanying drawings.

DETAILED DESCRIPTION OF THE INVENTION

Reference will now be made in detail to an implementation in accordance with methods, systems, and products consistent with the present invention as illustrated in the accompanying drawings. The same reference numbers may be used throughout the drawings and the following description to refer to the same or like parts.

Figure 1:
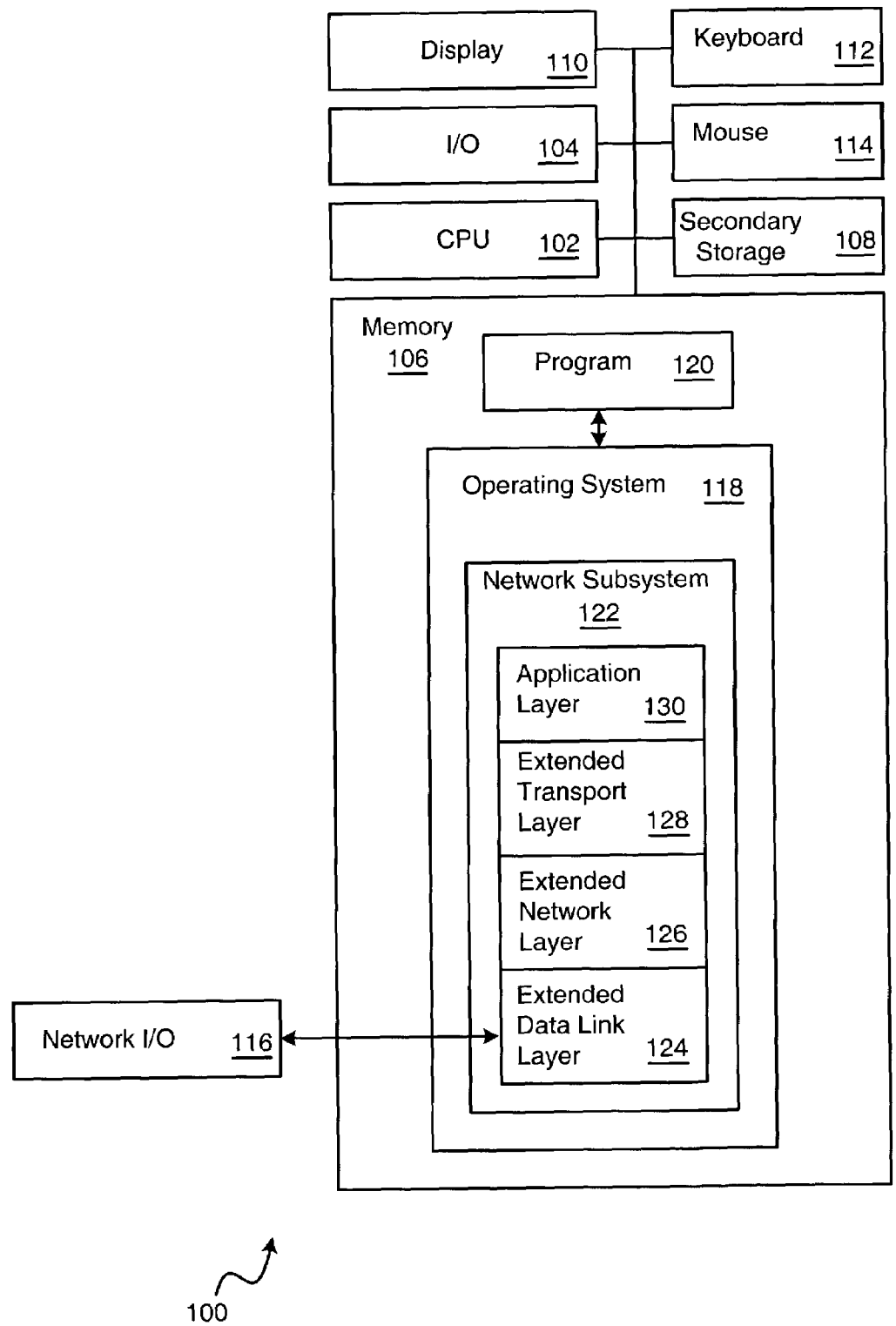
FIG. 1 depicts a block diagram of a data processing system suitable for practicing methods and implementing systems consistent with the present invention.

FIG. 1 depicts a block diagram of a data processing system 100 suitable for practicing methods and implementing systems consistent with the present invention. The data processing system 100 comprises a central processing unit (CPU) 102, an input output I/O unit 104 (e.g., for serial or parallel communication), a memory 106, a secondary storage device 108, and a video display 110. The data processing system 100 may further include input devices such as a keyboard 112, a mouse 114 or a speech processor (not illustrated). A network I/O unit 116 (e.g., a high speed network interface card) is provided to connect the data processing system 100 into a network. A separate network I/O unit 116 is not required, however, and the I/O unit 104 may instead provide network connection functionality.

An operating system 118 (e.g., UNIX, Solaris, or the like) stored in the memory 106. A program 120 communicates with the operating system 118 for network data transfers as will be described in more detail below. The program 120 may be virtually any program that communicates over a network, including a low level operating system program, a complex application such as a word processor, Internet browser, and the like.

The operating system 118 supports network communication by providing the network protocol 122. The network protocol 122 is generally layered (i.e., each layer builds upon the functionality of layers beneath it). The network protocol 122 includes an extended Data Link layer 124, an extended Network layer 126, an extended Transport layer 128, and an Application layer 130.

The network protocol 122 may be implemented (with the extensions explained in detail below) as a TCP/IP network protocol stack. For example, the network protocol 122 may be a STREAMS-based implementation of the TCP/IP protocol suite. STREAMS provides a flexible facility for the development of input/output services in many different operating systems. More information on STREAMS may be found, for example, in *Unix Systems V Release 4: Programmer's Guide: Streams*, Prentice Hall Inc. (Jun. 18, 1993), which is incorporated herein by reference in its entirety. More specifically, the network protocol may be implemented (extended as noted below) using Mentat TCP, available from Mentat Inc. of Los Angeles Calif., 90024.

When implemented as a TCP/IP protocol, the network protocol 122 provides IP processing at the extended Network layer 126 and TCP processing at the extended Transport layer. More information on the distinction between TCP/IP network layers and their functionality can be found, for example, in *Internetworking with TCP/IP Volume 1: Principles, Protocols and Architecture*, Douglas Corner, Prentice Hall Inc. (1995), which is incorporated herein by reference in its entirety.

Although aspects of the present invention are depicted as being stored in memory 106, one skilled in the art will appreciate that all or part of systems and methods consistent with the present invention may be stored on or read from other computer-readable media, for example, secondary storage devices such as hard disks, floppy disks, and CD-ROMs; a signal received from a network such as the Internet; or other forms of ROM or RAM either currently known or later developed. Further, although specific components of data processing system 100 are described, one skilled in the art will appreciate that a data processing system suitable for use with methods, systems, and articles of manufacture consistent with the present invention may contain additional or different components.

Figure 2:
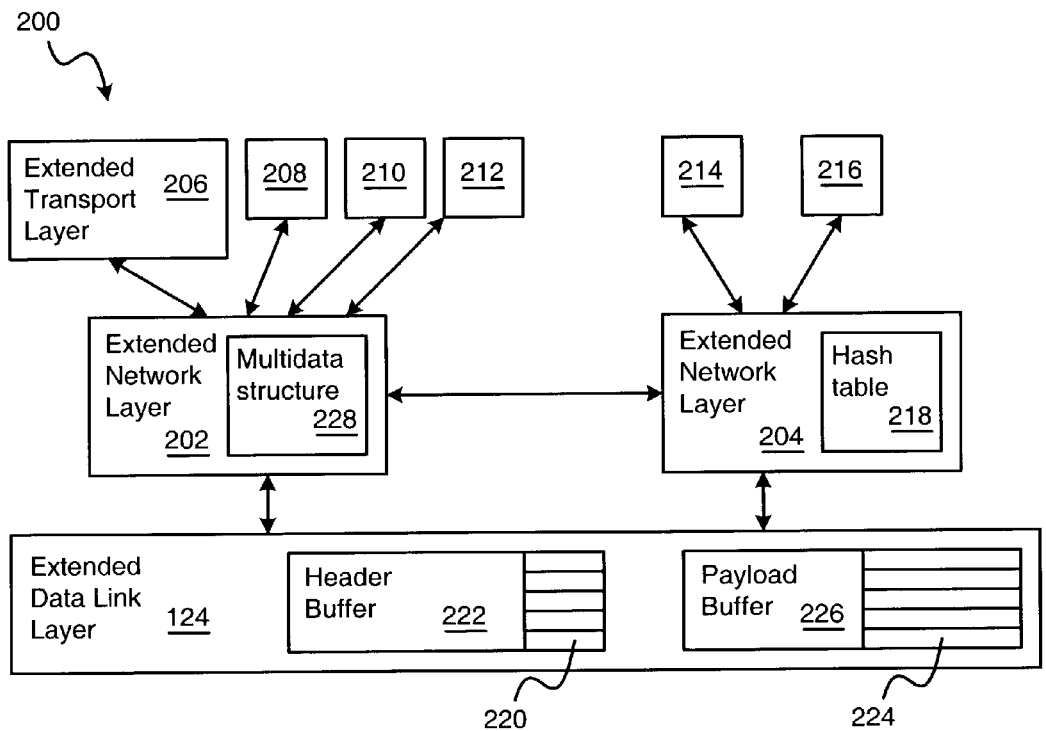
FIG. 2 shows an expanded view of the memory and network layers that handle extended amounts of data and that are present in the data processing system shown in FIG. 1.

FIG. 2 shows an expanded view 200 of a portion of the network protocol 122. In particular, the expanded view 200 shows the extended Data Link layer 124 in communication with two instances of the extended Network layer 126 (e.g., the IP layer) labeled 202 and 204. Each Network layer instance 202 and 204 is created at boot time, for example, to handle network communication for a different IP address assigned to the data processing system 100. Furthermore, the expanded view 200 shows multiple instances of the Transport layer (e.g., the TCP layer). The Network layer instance 202 communicates with the Transport layer instances 206, 208, 210, and 212 while the Network layer instance 204 communicates with the Transport layer instances 214 and 216.

The Transport layer instances are generally associated with a port number through which a program (e.g., the program 120) communicates over the network. The port number may be assigned to a program by the operating system 118, or the program may request a specific port number from the operating system (though the request may not be granted in all cases). Thus, an IP address and port number generally form a unique address that designates one of the Transport layer instances 206-216 and one of the programs running in the data processing system 100.

The Network layer instances 204-206 include a Hash table. One such Hash table 218 is shown incorporated into the Network layer instance 206. The Hash table for a given Network layer instance includes an entry for each Transport layer instance associated with the Network layer instance. In one embodiment, the entries are pointers to a data structure created by the network protocol 122 when each instance of the Transport layer is setup. The data structure includes a pointer to a message queue for the Transport layer with which it is associated. In other implementations, the Hash table may be replaced by a data base, text file, list, or the like that associates an IP address and port number with a Transport layer instance.

The extended Data Link layer 124 processes packets received form the network I/O unit 116 in a manner described in U.S. patent application Ser. No. 10/254,699, titled "Multi-Data Receive Processing According to a Data Communication Protocol", filed Sep. 24, 2002. In particular, as described in the above-noted application, the Data Link layer accepts individual packets over a network connection, and aggregates multiple packets together that are destined for the same entity, while splitting headers apart from the payloads. The payloads carry general purpose data for a program, while the headers carry routing information, error checking information, and the like.

Thus, as shown in FIG. 2, the Data Link layer 124 aggregates together multiple packet headers 220 in the header buffer 222 and aggregates together multiple packet payloads 224 in the payload buffer 226. The packet headers 220 are contiguously located in memory, as are the packet payloads 224. Thus, fewer accesses are required by a memory management unit to transfer the entirety of the payloads 224 to a destination (in contrast to the case in which single packets are placed in non-contiguous sections of memory).

As a result, rather than receiving a single packet per call from the Data Link layer, the network protocol 122 may receive multiple packets per call and deliver extended amounts of data (e.g., the aggregated payloads 224) to a recipient (e.g., another network layer, an application program, or the like). As will be described in more detail below, the Network layers 204-206 make use of a multi-data structure (one of which is labeled 228 in FIG. 2) when a data source provides aggregated headers and payloads.

A Network layer instance can determine whether the Data Link layer 124 supports packet aggregation by sending a capability request message to the Data Link layer 124 (typically when the network protocol 122 initializes). The Data Link layer 124 returns a capability request message response to the Network layer instance. In one implementation, the message is sent using the STREAMS putnext() function with arguments that specify the Data Link layer message queue and a message block pointer (of type mblk_t) to a message to be sent. The message itself includes a data block pointer (of type dblk_t) to a data block structure. The data block structure includes a message type field, and a pointer to a data block that holds the contents of the message. More information on putnext(), its parameters, and the underlying data structures may be found, for example, in the manual pages on data processing systems incorporating STREAMS. The STREAMS manual pages are incorporated herein by reference in their entireties.

More specifically, the Network layer 126 sends a message of type DL_CAPABILITY_REQ to the Data Link layer 124. Typically, no extra data accompanies the message. The Data Link layer 124 responds with a predefined DL_CAPABIL-ITY_ACK message type to the Network layer 126. The message response is actually several sub-messages, one per supported capability of the Data Link layer 124. In one implementation, one of the sub-messages is marked as type DL_CAPAB_MDR (for Multi-data capable receive). This message includes a flag that indicates whether multi-data capability is present in the Data Link layer 124. If the Network layer 126 receives the DL_CAPAB_MDR message and the flag is True, then the Network layer 126 has determined that the Data Link layer 124 is multi-data capable. In other words, the Network layer 126 has determined that the Data Link layer 124 aggregates packet headers and payloads.

The Data Link layer 124 informs the Network layer 126 that an extended data block (e.g., an aggregated set of payloads) has arrived and is ready for processing. To that end, the Data Link layer 124 sends the Network layer 126 a STREAMS message using putnex(). More specifically, the Data Link layer 124 initiates a call to putnex() with parameters that specify a Network layer message queue and a message. The message is marked M_MULTIDATA (in the dbik_t message type field) so that the Network layer 126 will recognize that the message pertains to an extended data item. The M_MULTIDATA message also includes a pointer (stored in the dblk_t data buffer pointer) to a data structure 228 that includes a header buffer identifier and a payload buffer identifier. More specifically, the multidata structure 228 sent in a M_MULTIDATA message may have the fields shown below in Table 1:

TABLE 1

Multi-data structure

| Field | Explanation |
| --- | --- |
| uint_t mmd_magic; | set to MULTIDATA_MAGIC |
| dblk_t *mmd_dp; | back pointer to dblk structure |
| mblk_t *mmd_hdr_blk; | pointer to header block (e.g., to the header buffer 222) |
| mblk_t *mmd_dta_blk; | pointer to data payload block (e.g., to the payload buffer 226) |
| kmutex_t mmd_attr_lock; | lock to protect the following two elements: |
| ql_t mmd_attr_pool; | pool of available attribute components |
| ql_t mmd_attr; | queue of shared (global) attributes |
| kmutex_t mmd_pd_lock; | lock to protect the following four elements: |
| ql_t mmd_pd_q; | list of packet descriptors |

TABLE 1-continued

Multi-data structure

| Field | Explanation |
|---|---|
| uint_t mmd_pd_cnt; | total number of packet descriptors |
| uint_t mmd_hdr_ref; | number of pkts referring to header block |
| uint_t mmd_dta_ref; | number of pkts referring to payload block |

The data types set forth in Table 1 are defined in the STREAMS manual pages. Note that the ql_t type is a doubly liked list, and the mmd_pd_q type is a circular doubly linked list of packet descriptors (discussed below). The MULTI-DATA_MAGIC specifies a pattern of digits that is useful for error checking. The pattern is set at the creation time for the data structure, and checked when the data structure is used. If the pattern is not as expected, data corruption has occurred.

The header buffer identifier specifies a header buffer (e.g., the header buffer 222) that holds multiple aggregated packet headers 220. The variable mmd_hdr_blk typically stores the header buffer identifier. The payload buffer identifier specifies a payload buffer (e.g., the payload buffer 226) that holds multiple aggregated payloads 224. The variable mmd_dta_blk typically stores the payload buffer identifier.

In one implementation, the packet descriptors may have the structure shown below in Table 2. The packet descriptors set forth characteristics of the individual packets in the aggregation of headers and payloads.

TABLE 2

| Field | Explanation |
|---|---|
| uchar_t *hdr_base; | a pointer to the start of the (extended) header in question (e.g., the head space 302) |
| uchar_t *hdr_lim; | a pointer to the end of the (extended) header in question (e.g., to the end of the tail space 306) |
| uchar_t *hdr_ptr; | a pointer to the start of the header data in question (e.g., the header data 304) |
| uchar_t hdr_len; | the length of the header data |
| uchar_t *dta_ptr; | a pointer to the start of the payload data associated with the header |
| uint_t dta_len; | the length of the payload data |

Figure 3:
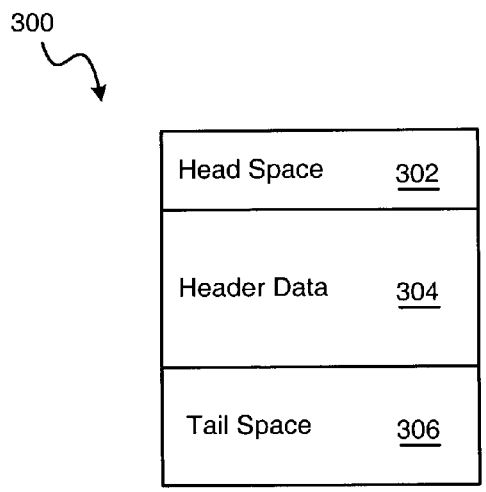
FIG. 3 shows a block diagram of a packet header extended to include a head space and a tail space to form an extended packet header that may be aggregated with other extended headers in a header buffer for subsequent processing in the data processing system of FIG. 1.

The fields describe the headers and payloads for individual packets in the set of aggregated packets. In particular, the pointers may specify virtual memory addresses. As shown in FIG. 3, an individual packet header may be extended to form the header block 300. Each header block 300 includes a head space 302, a data area 304 (where the original TCP/IP packet header is stored), and a tail space 306. The head space and the tail space allow gaps to be defined between the headers 220, if desired. The header blocks 300 may then be aggregated together in the header buffer 222.

The head space 302 may be used on transmission. For example, as a packet goes down the network stack, protocol headers may be prepended to the packet. By having extra space in front pre-allocated, the network protocol avoids allocating new space for the larger protocol header.

The tail space 306 may be used to accommodate cases where the headers are encrypted. In particular, because some encryption algorithms output more data than was input, the tail space 306 provides storage room for the extra data.

Referring again to Table 1, the multi-data structure includes variables (mmd_attr_pool and mmd_attr) to hold linked lists of attribute structures for the packet descriptors. Two exemplary attributes types and their common structure is shown below in Table 3.

TABLE 3

| #define MMD_ATTR_DSTADDRSAP | 0x1 | /* destination physical address + Service Access Point */ |
|---|---|---|
| #define MMD_ATTR_SRCADDRSAP | 0x2 | /* source physical address + Service Access Point */ |

| Structure Field | Explanation |
|---|---|
| uint8_t addr_is_group | whether the address is a broadcast or multicast address |
| uint8_t addr_len | length of address |
| uint8_t addr[l] | physical address |

An attribute may be shared among all packet descriptors or may be associated with an individual packet descriptor (private). There is no limit to the amount of attribute associations that can be added, and a mixture of shared and private attribute associations are possible. When an attribute is shared, subsequent packet descriptors added will inherit the shared association (and the attribute).

As noted above, a Network layer communicates, potentially, with many instances of the Transport layer. Thus, when the Network layer receives a message that an aggregated set of packets has been received, the Network layer determines which Transport layer instance to notify. The Transport layers are distinguished by IP address and port number. For that reason, the Network layer checks a header packet in the header buffer 222 to determine a port number and a source address for the aggregated payloads 224.

Note that the Network layer 126 need only check one packet header because the Data Link layer 124 has already aggregated individual packets that had the same destination. When the network protocol 122 is a TCP/IP network protocol, each packet header in the aggregated headers 220 will include an IP header and a TCP header. In that case, the Network layer 126 checks the source IP address specified in one of the IP headers, and the port number specified in one of the TCP headers to determine the Transport layer instance for which the aggregated payloads 224 are bound.

The Network layer 206 attempts to find a matching Transport layer instance structure pointer in the Hash table 218. In one implementation, the Hash function shown below in Table 4 determines a starting point in the Hash table 218 to begin searching for a matching Transport layer instance.

TABLE 4

((unsigned)(ntohl(ip_src) ^ (ports >> 24) ^ (ports >> 16) \
^ (ports >> 8) ^ ports) & (ipc_tcp_conn_hash_size - 1))

In Table 4, the "ports" variable is a 32-bit variable that holds a port number specified by the aggregated packet headers, ip_src is the source IP address of the packet, and ipc_tcp_conn_hash_size is set to 512. Note that ntohl() is a function available on many Unix-like systems that converts a 32-bit value from network-byte order to host-byte order.

If no matching Transport layer instance is found (e.g., the application and Transport layer for which the payloads were ultimately bound has terminated), the packets are discarded. Otherwise, the Network layer sends a STREAMS message to the matched Transport layer instance. In particular, the Network layer uses putnext() to send a M_MULTIDATA message to the message queue for the matched Transport layer instance. The message is generally the same as that received by the Network layer from the Data Link layer and specifies the same information listed in Table 1, including the header buffer identifier and payload buffer identifier. As a result, the Transport layer instance can process, forward, or otherwise manipulate the aggregated payloads and aggregated headers.

Figure 4:
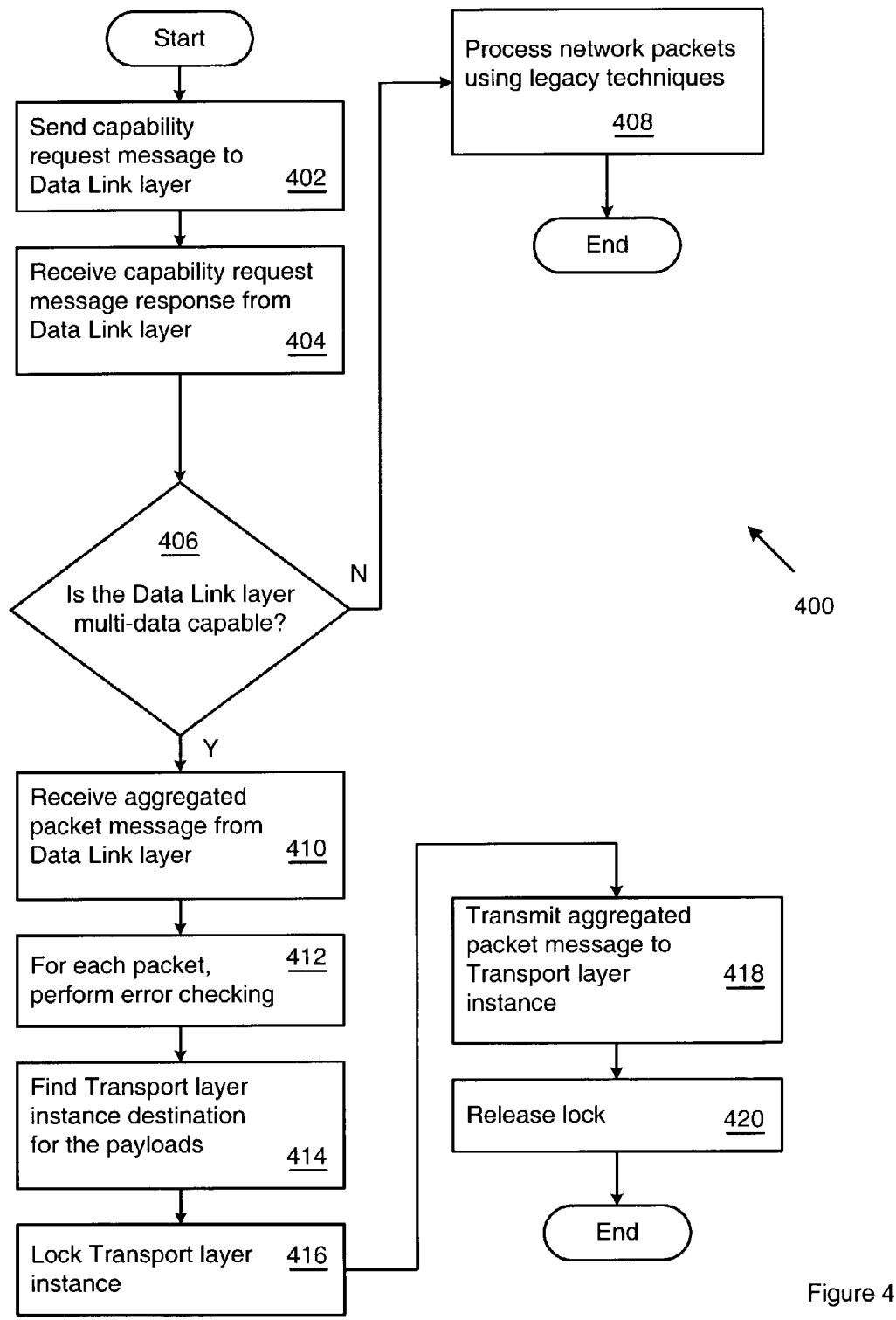
FIG. 4 shows a flow diagram for handling extended amounts of data in the network protocol shown in the data processing system of FIG. 1.

Turning next to FIG. 4, that figure shows a flow diagram of the processing performed by the extended Network layer 126 in the data processing system 100. The Network layer 126 sends a capability request message to the Data Link layer 124 (step 402) and subsequently receives the capability request message response (step 404). The Network layer 126, as explained above, determines whether the Data Link layer is multi-data capable (step 406). If not, the Network layer 126 processes data packets according to legacy techniques (step 408).

If the Data Link layer 124 is multi-data capable, however, the Network layer 126 proceeds to receive an aggregated packet message (e.g., an M_MULTIDATA message explained above) from the Data Link layer 124 (step 410). For each packet in the set of packets from which the Data Link layer 124 formed the aggregated packet headers 220 and aggregated payloads 224, the Network layer 126 performs error checking (step 412). As examples, the error checking may include comparing or computing checksums, comparing for valid destination and source addresses and port numbers, and the like.

The Network layer 126 then determines which Transport layer instance is the destination for the received payloads (step 414). To that end, as noted above, the Network layer may search a Hash table based on the a source address and port number in one of the aggregated packet headers 220. The Network layer 126 then asserts a write-lock on the Transport layer instance (step 416). Once the lock in is place, the Network layer 126 may then write an aggregated packet message to the Transport layer instance's queue (step 418). The Transport layer instance thus receives an M_MULTIDATA message that informs the Transport layer instance of the receipt of an aggregated set of payloads for further processing. After sending the message, the Network layer 126 releases the lock (step 420).

In general, the Network layer 126 may receive M_MULTIDATA messages from a data source other than the Data Link layer 124. In fact, any data source that aggregates packet headers and payloads in the manner noted above may pass an M_MULTIDATA message to the Network layer 126. Thus, for example, the data source may be the Transport layer 128. More specifically, the Transport layer 128, in the transmit direction, may aggregate headers and payloads in preparation for sending the packets to any given destination. Because the destination address might map to the same data processing system (e.g., to a second IP address also assigned to the data processing system), the Network layer 126 may receive an M_MULTIDATA message from the Transport layer 126, and, in response, send an aggregated packet message to another instance of the Network layer 126 on the same machine for processing as noted above.

The multi-data processing described above yields significant gains in network throughput. In part, the gains arise because fewer messages, data structure accesses, memory copies, and the like are used to transfer multiple packets of data between network layers. In part, the gains also arise because CPU cache efficiency is increased by having a "tight loop" of code that processes a group of packets using the same set of instructions. More efficient use of the CPU cache reduces the amount of work that the CPU needs to perform on fetching instruction/data from the main memory, and thus allows the CPU to perform other tasks as well. In other words, the processing noted above beneficially reduces the CPU utilization.

Furthermore, the multi-data processing reduces the number of times that locks have to be asserted or de-asserted in order to protect the data structures for a given number of packets. Reducing the number of locks is a critical aspect of increasing parallelism among different CPUs in a multi-processor system.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The first, second, and third network protocol layers recited in the claims are not necessarily synonymous with the first (Application), second (Transport), third (Network) layer or any other layer in the TCP/IP protocol model. Note also that the implementation may vary between systems. The invention may be implemented with both object-oriented and non-object-oriented programming systems. The claims and their equivalents define the scope of the invention.

What is claimed is:

1. A method in a data processing system having a network protocol stack comprising at least a first layer and a second layer different than the first layer, the method comprising steps performed by the second layer of:
   determining whether the first layer is multi-data capable, such that the first layer aggregates packets, by analyzing a capability message received from the first layer;
   when it is determined that the first layer is a multi-data capable layer, receiving, at the second layer, a first message sent by the first layer comprising a header buffer identifier and a payload buffer identifier, wherein the header buffer identifier specifies a header buffer comprising a plurality of aggregated packet headers, and wherein the payload buffer identifier specifies a payload buffer comprising a plurality of aggregated payloads;
   processing at least one of the aggregated packet headers to determine a destination for the aggregated payloads; and
   sending a second message comprising the header buffer identifier and the payload buffer identifier to the determined destination.

2. The method of claim 1, wherein the network protocol stack layers further include a third layer different than the first and second layers, wherein the determined destination is an instance of the third layer, and wherein:
   processing comprises determining a destination address for the aggregated payloads, and further comprising:
   determining that the destination address specifies the data processing system.

3. The method of claim 2, wherein determining that the destination address specifies the data processing system comprises accessing an Internet Protocol (IP) address in at least one of the packet headers.

4. The method of claim 2, further comprising:
   determining a destination port number for the aggregated payloads;

determining a source address for the aggregated payloads; and determining the instance of the third layer based on the destination port number and the source address.

5. The method of claim 4, wherein determining a destination port number comprises accessing a port identifier in at least one of the packet headers.

6. The method of claim 5, wherein the second layer is an Internet Protocol (IP) processing layer, wherein the third layer is a Transmission Control Protocol (TCP) layer, and wherein determining a destination port number comprises accessing a destination port field in a TCP header in at least one of the packet headers.

7. The method of claim 4, wherein determining the instance of the third layer comprises applying a Hash function to the destination port number and source address to determine a Hash result indicative of an instance of the third layer.

8. The method of claim 7, wherein the data processing system also has a Hash table comprising network layer instance identifiers, and further comprising searching the Hash table starting at the Hash result to find a matching network layer instance identifier.

9. The method of claim 8, wherein sending comprises sending the second message to the instance of the third layer that is associated with the matching network layer instance identifier.

10. The method of claim 1, wherein determining whether the first layer is multi-layer capable comprises sending a capability request message to the first layer.

11. The method of claim 1, wherein the first layer is a Data Link layer, and wherein the second layer is an Internet Protocol (IP) processing layer.

12. The method of claim 2, wherein the third layer is a Transmission Control Protocol (TCP) processing layer.

13. A computer-readable storage medium containing instructions that cause a data processing system, having a processor and a network protocol stack having network protocol layers comprising at least a first layer and a second layer different than the first layer, to perform a method comprising steps performed by the second layer of:
determining whether the first layer is multi-data capable, such that the first layer aggregates packets, by analyzing a capability message received from the first layer;
when it is determined that the first layer is a multi-data capable layer, receiving, at the second layer, a first message sent by the first layer comprising a header buffer identifier and a payload buffer identifier, wherein the header buffer identifier specifies a header buffer comprising a plurality of aggregated packet headers, and wherein the payload buffer identifier specifies a payload buffer comprising a plurality of aggregated payloads;
processing, at least one of the aggregated packet headers to determine a destination for the aggregated payloads; and
sending a second message comprising the header buffer identifier and the payload buffer identifier to the determined destination.

14. The computer-readable medium of claim 13, wherein the network protocol stack layers further include a third layer different than the first and second layers, wherein the determined destination is an instance of the third layer, and wherein:
processing comprises determining a destination address for the aggregated payloads, and further comprising:
determining that the destination address specifies the data processing system.

15. The computer-readable medium of claim 14, wherein determining that the destination address specifies the data processing system comprises accessing an Internet Protocol (IP) address in at least one of the packet headers.

16. The computer-readable medium of claim 14, further comprising:
determining a destination port number for the aggregated payloads;
determining a source address for the aggregated payloads; and
determining the instance of the third layer based on the destination port number and the source address.

17. The computer-readable medium of claim 16, wherein the second layer is an Internet Protocol (IP) processing layer and wherein the third layer is a Transmission Control Protocol (TCP) layer, and wherein determining a destination port number comprises accessing a destination port field in a TCP header in at least one of the packet headers.

18. The computer-readable medium of claim 16, wherein determining the instance of the transport layer comprises applying a Hash function to the destination port number and the source address to determine a Hash result indicative of an instance of the third layer.

19. The computer-readable medium of claim 18, wherein the data processing system also has a Hash table comprising network layer instance identifiers, and further comprising:
searching the Hash table starting at the Hash result to find a matching network layer instance identifier; and
wherein sending comprises sending the second message to the instance of the third layer instance associated with the matching network layer instance identifier.

20. The computer-readable medium of claim 13, wherein the first layer is a Data Link layer, and wherein the second layer is an Internet Protocol (IP) processing layer.

21. A data processing system comprising:
a memory comprising a data source and a network protocol stack comprising a first layer and a second layer different than the first layer, the second layer:
determines whether the first layer is multi-data capable, such that the first layer aggregates packets, by analyzing a capability message received from the first layer,
when it is determined that the first layer is a multi-data capable layer, receives, at the second layer, a first message sent by the first layer comprising a header buffer identifier and a payload buffer identifier, wherein
the header buffer identifier specifies a header buffer comprising a plurality of aggregated packet headers, and wherein the payload buffer identifier specifies a payload buffer comprising a plurality of aggregated payloads;
processes at least one of the aggregated packet headers to determine a destination for the aggregated payloads; and
sends a second message comprising the header buffer identifier and the payload buffer identifier to the determined destination; and
a processor for running the network protocol.

22. The data processing system of claim 21, wherein the second layer is an Internet Protocol (IP) processing layer.

23. The data processing system of claim 21, wherein the determined destination is a third layer of the network protocol that aggregates packets, the third layer being different that the first layer and the second layer.

24. The data processing system of claim 23, wherein the third layer is a Transmission Control Protocol (TCP) processing layer.

25. The data processing system of claim 23, wherein the first layer is a Data Link layer.

26. The data processing system of claim 23, wherein the second layer determines a destination address for the aggregated packet data and, when the destination address specifies the data processing system.

27. The data processing system of claim 26, wherein the second layer determines a destination port number and a source address for the aggregated packet data and determines the instance of the third layer based on the destination port number and the source address.

28. The data processing system of claim 27, wherein the third layer is a Transmission Control Protocol (TCP) processing layer, and wherein determining a destination port number comprises accessing a destination port field in a TCP header in at least one of the packet headers.

29. The data processing system of claim 28, wherein the memory further comprises a Hash table comprising network layer instance identifiers, and wherein the second layer further searches the Hash table starting at the Hash result to find a matching network layer instance identifier, and sends the second message to the third layer instance associated with the matching network layer instance identifier.

30. The data processing system of claim 27, wherein the second layer applies a Hash function to the destination port number and the source address to determine a Hash result indicative of an instance of the third layer.

31. The data processing system of claim 21, wherein the data source is a separate instance of the second layer.

32. A data processing system having network protocol stack layers comprising at least a first layer and a second layer different than the first layer, the data processing system comprising:
    means for determining whether the first layer is multi-data capable such that the first layer aggregates packets;
    means for receiving at the second layer, when the first layer is a multi-data capable layer, a first message sent by the first layer comprising a header buffer identifier and a payload buffer identifier, wherein
    the header buffer identifier specifies a header buffer comprising a plurality of aggregated packet headers, and wherein the payload buffer identifier specifies a payload buffer comprising a plurality of aggregated payloads; and
    means for processing, by the second layer, at least one of the aggregated packet headers to determine a destination for the aggregated payloads.

33. A computer-readable memory device encoded with a data structure that is accessed by a first network layer encoded in the computer-readable memory device and that is run by a processor in a data processing system, the data structure comprising entries comprising:
    a header buffer identifier specifying a header buffer storing aggregated packet headers; and
    a payload buffer identifier specifying a payload buffer storing aggregated payloads associated with the packet headers,
    wherein the data structure is accessed by the first network layer to determine a destination for the aggregated payloads received by the data processing system.

34. The computer-readable memory device of claim 33, wherein the data structure further comprises a packet descriptor identifier for specifying at least one packet descriptor for a payload in the aggregated payloads and for a header in the aggregated packet headers.

35. The computer-readable memory device of claim 34, wherein the packet descriptor comprises a payload data specifier that points to a start of the payload and a header data specifier that points to a start of the header.

36. A method in a data processing system having network protocol layers comprising at least a Data Link layer, an Internet Protocol (IP) layer, and a Transmission Control Protocol (TCP) layer, the method comprising steps performed by the IP layer of:
    sending a capability request message from the IP layer to the Data Link layer;
    receiving a capability request message response from the Data Link layer at the IP layer;
    determining, based on the capability request message response, that the Data Link layer aggregates individually received packets;
    receiving, at the IP layer, a first message sent by the Data Link layer comprising a header buffer identifier and a payload buffer identifier, wherein
    the header buffer identifier specifies a header buffer comprising a plurality of aggregated packet headers, and wherein the payload buffer identifier specifies a payload buffer comprising a plurality of aggregated payloads;
    processing, by the IP layer, a port number, a source IP address, and a destination IP address in at least one of the aggregated packet headers to determine a destination for the aggregated payloads;
    determining when the destination IP address specifies the data processing system and in response sending a second message comprising the header buffer identifier and the payload buffer identifier to an instance of the TCP layer.

37. The method of claim 36, further comprising determining the instance of the TCP layer by applying a Hash function to the port number and source IP address to determine a Hash result indicative of an instance of the TCP layer.

38. The method of claim 37, wherein the data processing system also has a Hash table comprising network layer instance identifiers, and further comprising searching the Hash table starting at the Hash result to find a matching network layer instance identifier.

39. The method of claim 38, wherein sending comprises sending the second message to the TCP layer instance that is associated with the matching network layer instance identifier.

* * * * *